April 22, 1958 A. PARMET 2,831,745
DESK TYPE CONTROL CABINET CONSTRUCTIONS FOR ELECTRONIC AND ELECTRICAL APPARATUS
Filed June 1, 1954 4 Sheets-Sheet 1
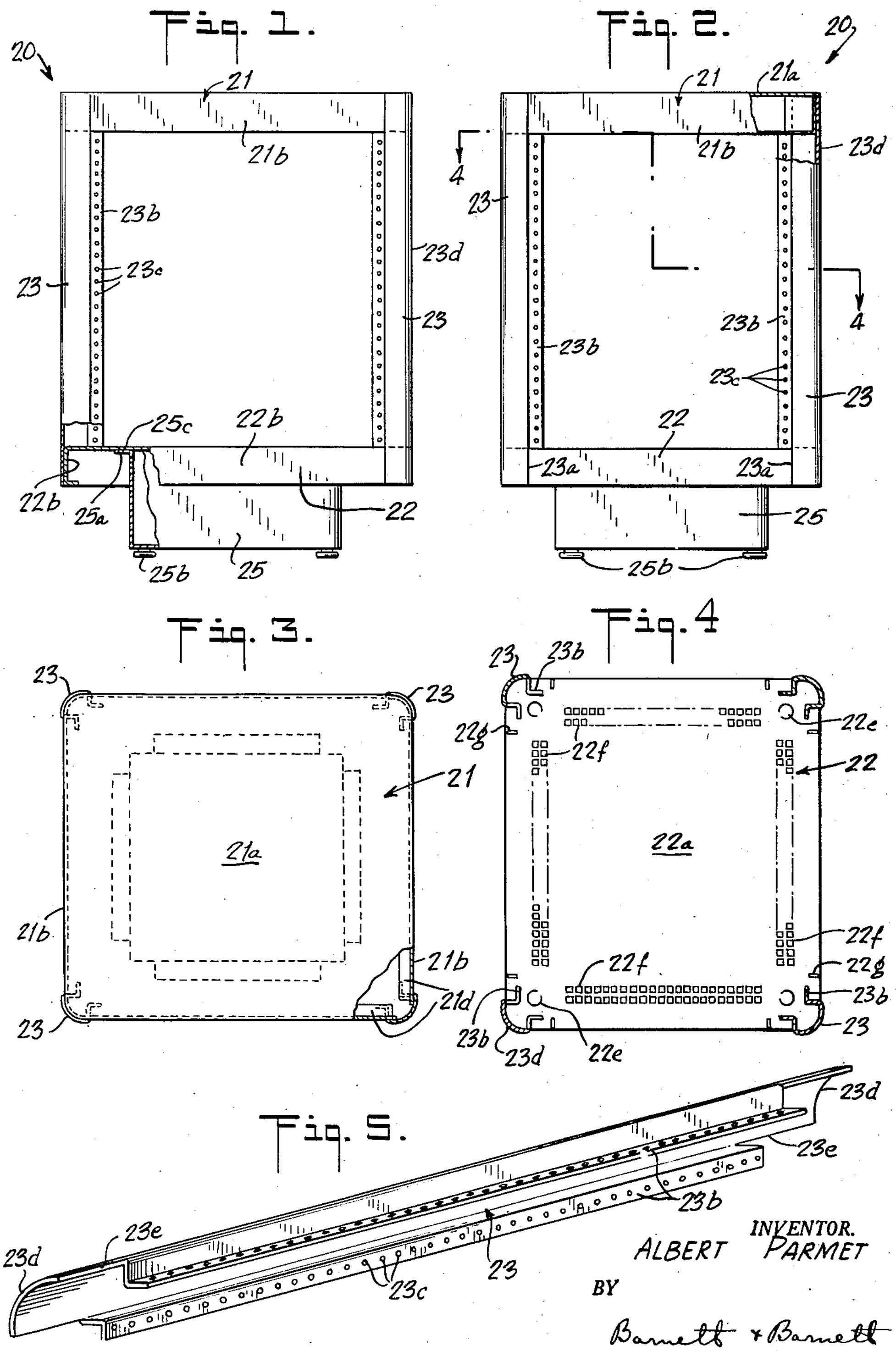
INVENTOR.
ALBERT PARMET
BY
Barnett & Barnett
ATTORNEYS April 22, 1958 A. PARMET 2,831,745
DESK TYPE CONTROL CABINET CONSTRUCTIONS FOR ELECTRONIC AND ELECTRICAL APPARATUS
Filed June 1, 1954 4 Sheets-Sheet 2
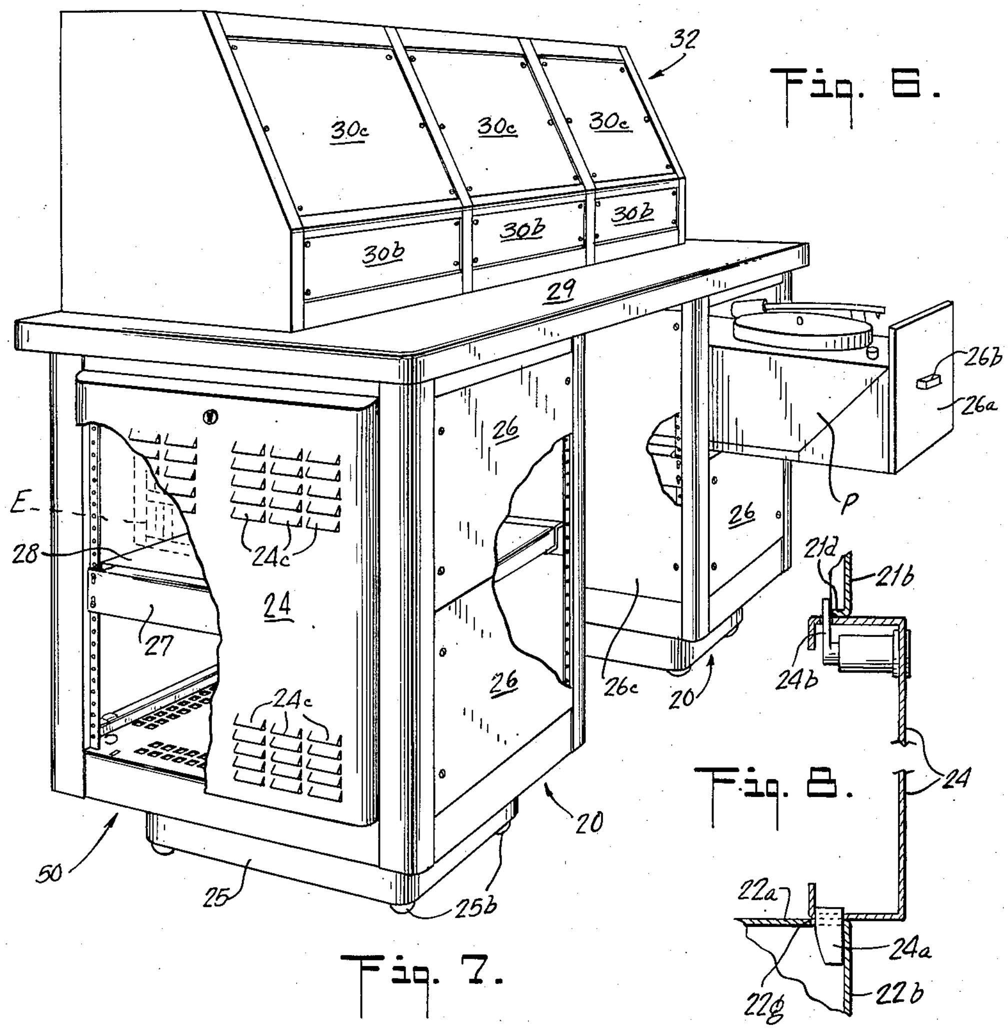
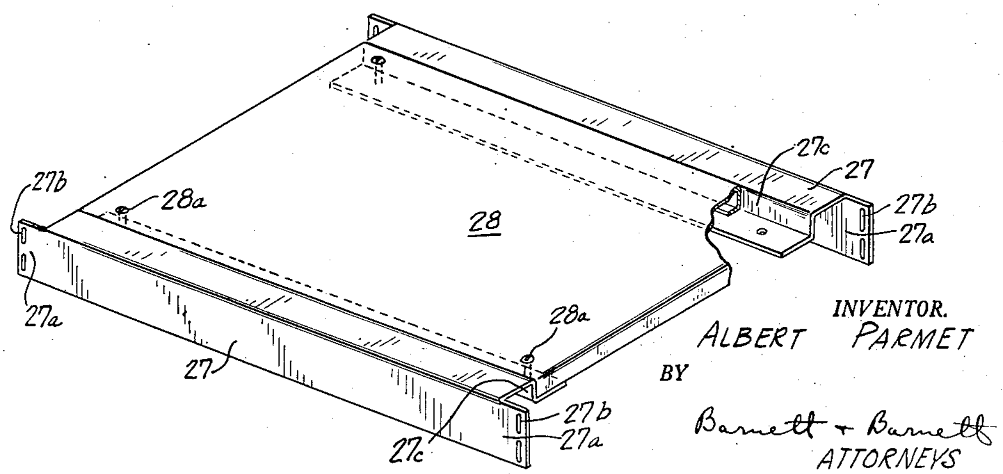
INVENTOR.
ALBERT PARMET
BY
Barnett & Barnett
ATTORNEYS Fig. 9
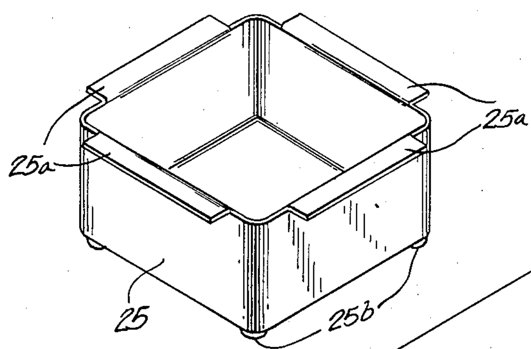
Fig. 10.
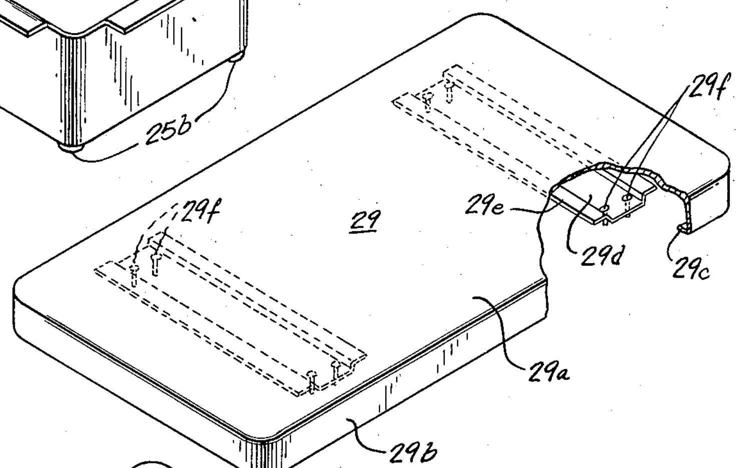
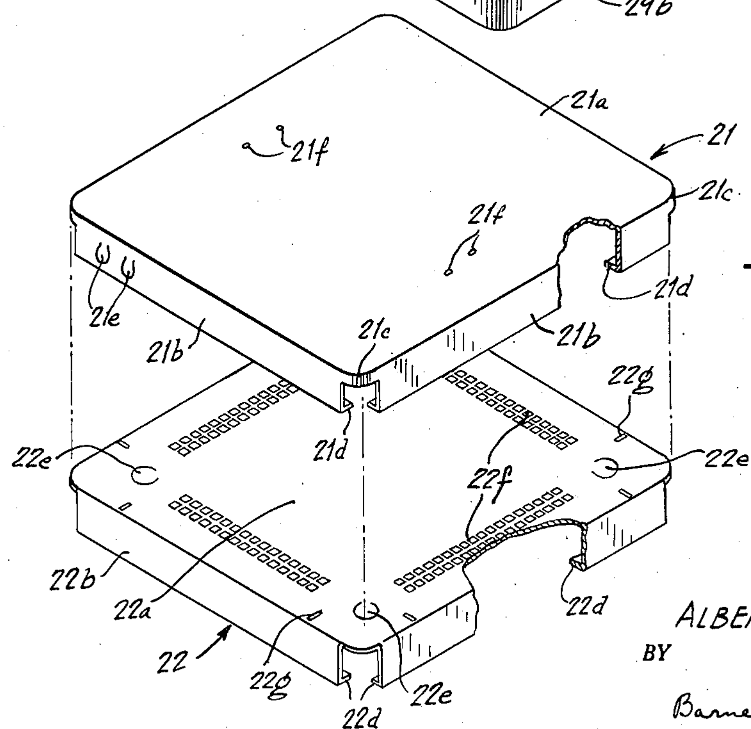
Fig. 11.
INVENTOR.
ALBERT PARMET
BY
Barnett + Barnett
ATTORNEYS

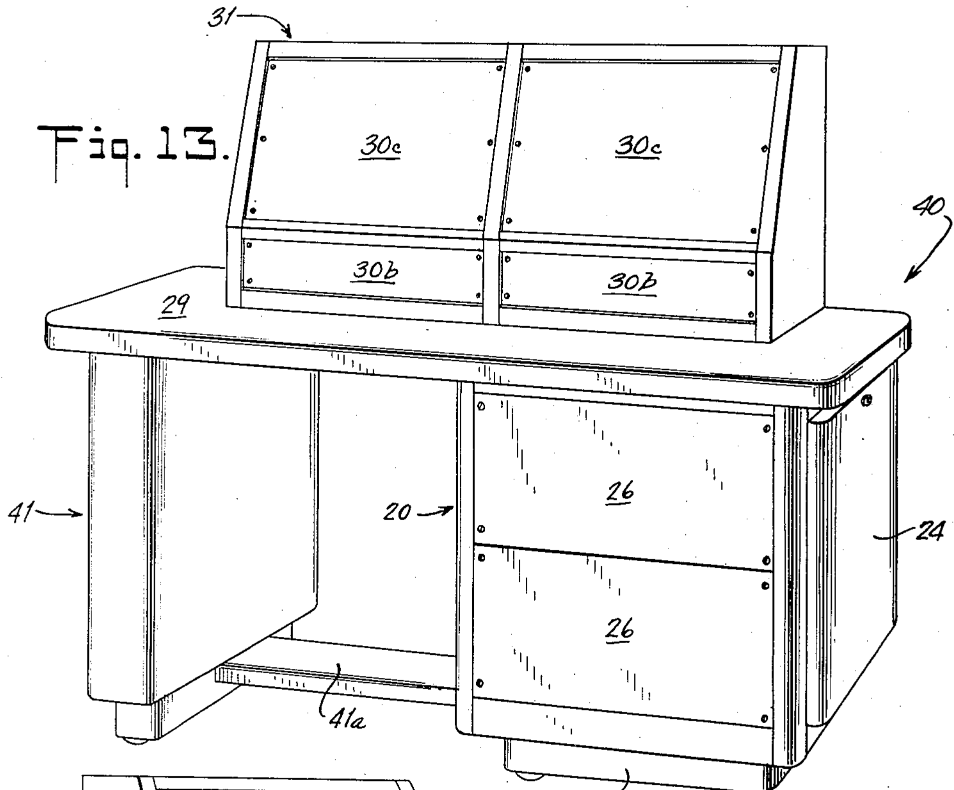
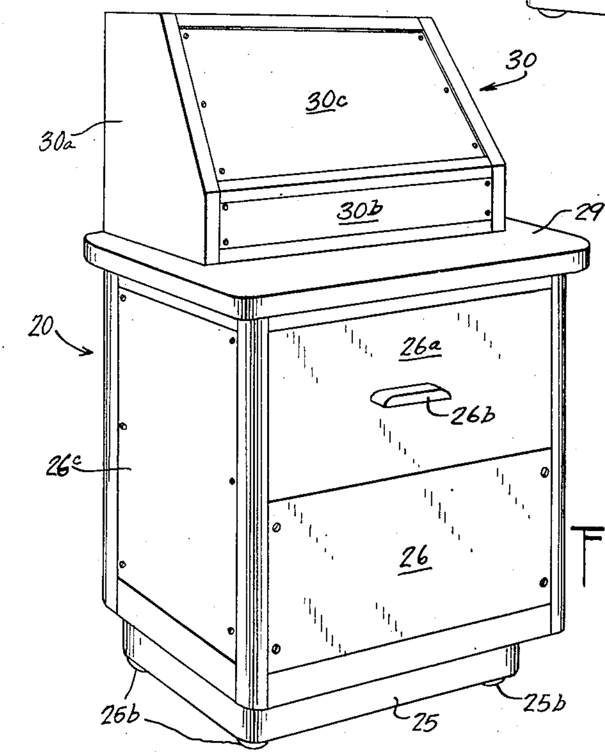
INVENTOR.
ALBERT PARMET
BY
Barnett & Barnett
ATTORNEYS 2,831,745

DESK TYPE CONTROL CABINET CONSTRUCTIONS FOR ELECTRONIC AND ELECTRICAL APPARATUS

Albert Parmet, West Hempstead, N. Y., assignor to Par-Metal Products Corp., Long Island City, N. Y., a corporation of New York Application June 1, 1954, Serial No. 433,454

4 Claims. (Cl. 312—257)

This invention relates to desk type control cabinet constructions for electronic and other electrical apparatus and more particularly is directed to improvements in construction and assembly of groups of parts or standardized units in selective combinations ready for use in radio control stations, as testing apparatus, sound distribution systems and the like applications.

Among the objects of the invention is to generally improve desk and control cabinet constructions of the character described which shall comprise a minimum of simple prefabricated parts that are readily assembled and grouped to provide standardized units whereby the same may be stored and shipped in compact form and easily assembled on the job without requiring skilled mechanical service, which shall be relatively cheap to manufacture, which when assembled shall form a strong rigid housing structure giving maximum ready access to the interior and contents carrying portions to facilitate installation, inspection and servicing of electronic equipment housed therein, which standardized units may be selectively combined and assembled in the manner hereinafter described and shown to supply suitably a wide range of operating requirements and demands and thereby eliminating costly custom built constructions, which shall form a neat, attractively appearing support and enclosure for convenient mounting and arranging measuring, testing, sound distributing apparatus and the like, and which shall be practical and efficient to a high degree in use.

Other objects of the invention will in part be obvious and in part hereinafter pointed out.

The invention accordingly consists of features of constructions, combination of elements and arrangements of parts which will be exemplified in the constructions hereinafter disclosed, the scope of the application of which will be indicated in the claims following.

In the accompany drawing in which various embodiments of the invention are shown:

Figs. 1, 2 and 3 are front, side and top plan views, respectively, showing an improved pedestal unit assembly constructed to embody the invention, each partly broken away to expose either the bottom or top corners thereof.

Fig. 4 is a cross-sectional view taken on line 4—4 in Fig. 2 showing assembly of the spaced apart uprights with the bottom section or member forming said pedestal unit.

Fig. 5 is a perspective view of one of the uprights or supporting posts removed from the pedestal unit shown in Figs. 1 to 4 which serves as an edge corner for retaining upper and lower pedestal members in spaced apart parallel alignment.

Fig. 6 is a perspective view of a completed triple unit assembled type of control desk cabinet construction embodying the invention with two of the improved pedestals, such as, shown in Figs. 1 to 3, supporting a desk top on which a cabinet or turret is mounted, a portion of the paneling of said pedestal being broken away to expose underlying structure, and the other pedestal being shown with a drawer mounting a record player projected in a frontwardly extending position.

Fig. 7 is a perspective view showing a pair of mounting brackets and shelf removed from the pedestal construction shown in Fig. 6 with the shelf component partly broken away to expose the mounting assembly thereof.

Fig. 8 is a fragmentary view showing one of the panel or door stud aligning bottom fingers of a "slip-in" type with a top releasable spring catch and lock for retaining each door panel as a closure for a side of the pedestal.

Fig. 9 is a perspective view of the step-in base removed from the pedestal shown in Figs. 1 or 6.

Fig. 10 is a perspective view of the desk top removed from the construction shown in Figs. 6, or 13, partly broken away to show the means for bolting to an underlying structure.

Fig. 11 is a perspective view of the upper and lower components or members of the pedestal body removed from the construction shown in Figs. 1 to 4.

Figs. 12 and 13 are perspective views of improved single and double standardized unit assembly type of control desk cabinet constructions embodying the invention, respectively, and Fig. 14 is a perspective view of an end stanchion and floor brace used in forming the double standardized assembly type of control desk cabinet construction removed from the construction shown in Fig. 13 adapted to be used with a single pedestal unit.

Referring in detail to the drawings, 20 denotes a pedestal unit of improved construction embodying the invention.

As shown in Figs. 1 to 5, 9, 10 and 11, said unit 20 may comprise a body portion of substantially rectangular cross-section having a horizontally disposed upper member 21, a lower member 22 rigidly held in spaced parallel alignment with top member 21 by spaced apart uprights or supporting posts 23. The latter serve as vertically extending edge corners for the pedestal unit 20 which with removably mounted panel sides or doors denoted generally at 24 provide content enclosures, as is clear from Figs. 6, 12 and 13.

Pedestal upper and lower members 21 and 22, respectively, may each be formed of sheet metal bent and drawn to the size and shape to provide rectangular shaped horizontal faces **21*a* and 22*a* preferably with rounded corner edges and vertically extending straight stretcher sides or side walls 21*b* and 22*b*, respectively, downturned along the peripheral edges of said faces 21*a* and 22*a*. Each of said stretcher sides 21*b* and 22*b* may be formed with a suitable reinforcing means lengthwise thereof, such as, inturned edge flanges 21*d* and 22*d*, as is clear from Fig. 11. The corner edges of upper member 21 may be drawn to provide integral interconnecting flanges 21*c* between adjacent stretcher sides 21*b* and face 21*a*** forming smooth rounded corners, as is clear from Fig. 11.

Pedestal upper member 21 may be formed with knockouts **21*e* for conduit holes suitably positioned and partially punched from two opposite stretcher sides 21*b*** as shown in Fig. 11.

Pedestal lower member 22 may also be provided with knockouts **22*e* or conduit holes partially punched from face 22*a* inwardly of the spaced apart corners thereof as shown in Fig. 11. Suitable ventilating means for the interior pedestal unit 20 may be incorporated with said lower member 22 by providing rows of unobstructed through-perforations 22*f* extending inwardly of the perimeter of face 22*a* and communicating said pedestal interior with the exterior, as is clear from Figs. 4, 6 and 11. Said lower member 22 may also be slotted as at 22*g* to receive and cooperate with projecting studs 24*a* of the slip-in type of interchangeable doors or panels 24**, as shown in detail in Fig. 8.

To give the unit 20 distinctively attractive appearance, there is provided a stepped-in base 25 which not only is made to serve for providing toe space for the attendant or operator but also is shaped, sized and positioned to give free access to ventilation from the interior to the exterior of the pedestal unit 20 by means of said rows of through-perforations **22*f***, as is clear from Figs. 4, 6, 9 and 12.

Said base 25 as seen in Fig. 9, may be an oblong sheet metal box-like structure having a suitably formed flange or flanges **25*a* on upfacing side and equipped with height adjustable glider type casters 25*b* of any well known manufacture projecting down from the downfacing side thereof so that said unit 25 may be made to be readily moved and leveled on uneven floors in the well understood manner, base flanges 25*a* being rigidly secured to the underside of pedestal lower member 22 inwardly of said ventilating through-perforations 22*f* and knockouts 22*e***.

To provide pedestal unit 20 in a structurally complete prefabricated rigid form, upper and lower members 21 and 22, respectively, may be welded in parallelly aligned position to opposite ends of said spaced apart posts 23 as at **23*a*; and also base flanges 25*a* to said underside of pedestal lower member 22 as at 25*c*** as indicated in Figs. 1 and 2.

In practicing the invention, pedestal unit 20 and doors 24 may be made easily removable allowing free access to the interior between upper and lower members 21 and 22 from any and all sides, and in order that said posts 23 may also be used for mounting rack panels 26 interchangeable with doors 24 or selectively attaching shelf brackets 27 in desired adjustable levels supporting electronic equipment E, such as, receivers, transmitters and amplifiers, on shelf 28 or drawer mounted record players P, and the like, as for example, as shown in Fig. 6.

To this end, said posts 23 may each be formed with opposite longitudinally extending edge border flanges **23*b* thereof in sunken relation, that is, offset in an inward direction and in parallel relation with respect to a plane of each open side of the pedestal unit 20 to provide a seat for the flush rack closure panels 26 or for attaching brackets 27 yet not interfering with mounting of the doors 24 when the latter are installed. Said flanges 23*b* may be drilled and tapped with rows of aligned holes 23*c*** on so-called "universal" centers to provide for mounting of corresponding drilled standard equipment aforementioned.

As seen in Figs. 1, 4 and 5, each post 23 has a curved, that is, an arcuately shaped mid-portion **23*d* from which said flanges 23*b* project in right angle relation with respect to each other. Said post mid-portion 23*d* may be so proportioned to serve as a conduit through which wiring can be housed in passing from the wiring installation through knockouts into said pedestal unit 20 thereby utilizing space that may otherwise be wasted and making available additional room for the electrical equipment or apparatus mounted in said pedestal unit. The opposite end portions of each flange 23*b* may be cut back as at 23 so as to form lap joints with the adjoining upper and lower members 21 and 22, respectively, at said welds 23*a***.

Shelf brackets 27 may each be formed of an angle bar having opposite ends thereof cut back corresponding to the distance between posts 23, the uncut bracket ends **27*a* being slotted as at 27*b* to conform with said universal spacing of holes 23*c* on posts 23**.

The bracket portion **27*c* between said cutbacks may be offset to provide a mounting base for shelf 28 or other equipment E rigidly secured in place by bolts or screws 28*a***.

A finishing top 29 may be provided for pedestal unit 20 to complete the same as commercial articles, as for example, those shown in Figs. 6, 12 and 13. As shown in detail in Fig. 10, finishing top 29 may comprise a sheet metal structure having a top face **29*a*, downturned sides 29*b* which have inturned border flanges 29*c*. Finishing top 29 may be of any required shape, here shown as either square or rectangular with rounded corners, and may have suitable concealed fastening means in the form of one or more stiffening brackets 29*d* having levelling flanges 29*e* welded or otherwise secured to the underside of top face 29*a* and formed with a channel-shaped offset for retaining the heads of fastening bolts 29*f* and positioning the shanks thereof to extend through openings 21*f* in upper member 21 of each pedestal unit 20 for securing finishing top 29** in properly required aligned position.

When it is desired to use a desk panel cabinet 30 with a single pedestal unit 20 mounted on finishing top 29 as shown in Fig. 12, cabinet 30 is secured in position by any well known means in which case through-openings may be provided as by drilling in finishing top 29 to permit passage of wiring or the like therethrough to communicate the equipment E within pedestal unit 20 with the instruments or controls in the panel cabinet 30. The latter, as seen from Fig. 12, may be of any suitable construction having side walls **30*a*, a removable or replaceable front vertical panel 30*b* for surface switches or the like and a sloping removable or replaceable panel 30*c*** for instrument dials, scales, signal lights, etc.

After providing pedestal unit 20 assembled with finishing top 29 and a desk panel cabinet 30 as described above and shown in Figs. 1 to 5 and 9 to 11, inclusive, the utility of the invention is apparent.

Pedestal unit 20 now may be fitted for electronic equipment E by mounting brackets 27 at a desired level by means of screws **23*f* passing through slots 27*b* into said flange tapped holes 23*c* and securing shelf 28 in place by bolts 28*a*. In this fitted position, shelf 28 leaves post mid-portions 23*d* free of any obstruction to serve as conduits for circuit wiring, not shown, brought into pedestal unit 20 through any of the holes formed by dislodging lower member knockouts 22*c*, as is clear from Figs. 4, 6 and 7. Said circuit wiring may also be provided in the well understood manner for interconnecting indicator instruments and controls installed in panel cabinet 30 in circuit with equipment E installed in pedestal unit 20, such wiring extending along said post mid-portions 23*d* where desirable and through suitable openings provided in required positions in upper member 21 and finishing top 29 to register with knockout holes provided in the bottom of panel cabinet 30**, not shown.

After completing the installation and wiring of equipment E, the open sides, front and rear of pedestal unit 20 may be closed by securing as desired closure panels 26 in position by screw mounting on post border flanges **23*b* or doors 24 may be mounted as closures by first inserting studs 24*a* into slots 22*g* and then swinging door 24 into vertical position so that key operated bolt 24*b* upon rotation releasably engages against inturned edge flange 21*d***, as is clear from Fig. 8.

In Fig. 12 is shown a single standardized unit assembly type of control desk cabinet construction embodying the invention which includes in combination a pedestal unit 20 complete with finishing top 29 and single panel cabinet 30, a drawer **26*a* having pull handle 26*b* being shown installed in the upper half of pedestal unit 20 with a closure panel 26 utilized as a cover for the bottom half of the front beneath drawer 26*a*. A single double length panel 26*c* may be used as shown as a side or rear closure for pedestal unit 20 or, for both convenience and appearance, slip-in type doors 24 with or without louvres 24*c*** may be substituted.

A modification is shown in Fig. 13 as a double standardized unit 40 which includes in combination one pedestal unit 20, an end stanchion 41 fitted with a floor brace extension **41*a* complete with a properly sized finishing top 29 and a double panel cabinet 31 fitted with a pair of front vertical panels 30*b* and a pair of sloping panels 30*c* in the same manner as single panel cabinet 30. Pedestal unit 20 is shown with a pair of closure panels 26 and a door 24** serving as front and side covers, respectively.

Another modification is shown in Fig. 6 as a triple standardized unit 50 which includes in combination a pair of pedestal units 20 interconnected in spaced apart relation by finishing top 29 of proper size to form a knee-hole type desk complete with triple panel cabinet 32 fitted with front vertical panels **30*b* and sloping panels 30*c***.

Further exemplifying the versatility of pedestal unit 20 embodying the invention, Fig. 6 shows triple unit 50 with one of the pedestal units 20 having a sliding drawer **26*a* fitted with a record player P, drawer 26*a* being mounted for in and out movement on brackets 27 and shelf 28 by any suitable means, as for example, guide rail slideways, not shown. Closure panel 26 serves as a front cover for the compartment below drawer 26*a* which is available for storage or for additional installed equipment, a single double length panel 26*c* being shown as a demountable side cover similar to that shown for unit 20 in Fig. 12. The other pedestal unit 20 of triple unit 50 may be provided equipped as in any of the assemblies described above and is here illustrated with brackets 27 and shelf 28 installed for mounting electronic equipment E, a pair of closure panels 26 serving as covers for the compartmented front and door 24 serving as a side closure with louvres 24*c* provided for ventilation and aiding the circulation and exchange of air from lower member through-perforations 22*f***.

It is thus seen that there is provided improved desk type control cabinet constructions for electronic and other electrical apparatus in which the several objects of the invention are achieved and which are well adapted to meet conditions of practical use.

As various possible embodiments might be made in the above invention, and as various changes might be made in the constructions above set forth, it is to be understood that all the matters herein set forth or shown in the accompanying drawings are to be interpreted as illustrative and not in a limiting sense.

Having thus described my invention, I claim as new and desire to secure by Letters Patent:

1. In a desk type of control cabinet construction, a pedestal unit comprising horizontally disposed parallelly aligned upper and lower members each having four corners, elongated vertically extending corner posts rigidly securing said members to provide open sides therebetween with each open side extending in a plane, each of said corner posts being formed of sheet metal having a mid-portion bent around to conform in cross section to said member corners and having offset rim border flanges each lying in a plane at right angles to each other disposed inwardly of and in parallel alignment with said first mentioned open side planes, said flanges each having drilled and tapped holes extending substantially along the length thereof in predetermined spacing alignment for screw mounting shelf supporting brackets extending across two opposite open sides at selective heights.

2. In a desk type of control cabinet construction, the pedestal unit defined in claim 1 in which said upper and lower members have rim portions formed with vertically extending side walls, a slip-in type panel door removably secured in at least one of said open sides over said flanges and engaging portions of said upper and lower member side walls bordering said last mentioned open side, said panel door being shaped to clear said flanges and mounting means attached thereto.

3. In a desk type of control cabinet construction, a pedestal unit comprising horizontally disposed parallelly aligned upper and lower members each having four corners, elongated vertically extending corner posts rigidly securing said members to provide open sides therebetween with each open side extending in a plane, each of said corner posts being formed of sheet metal having a mid-portion bent around to conform in cross section to said member corners and having offset rim border flanges each lying in a plane at right angles to each other disposed inwardly of and in parallel alignment with said first mentioned open side planes, said flanges each having drilled and tapped holes extending substantially along the length thereof in predetermined spacing alignment, shelf supporting brackets extending across two opposite open sides having ends screw mounted to some of said tapped holes at a selective level above said lower member, a shelf mounted between said brackets extending horizontally to divide the unit interior into upper and lower compartments, said lower member being formed with knockouts adjacent each corner, said post mid-portions on the interior side thereof being unobstructed and providing conduits for wiring entering by way of said knockouts and communicating between said upper and lower compartments.

4. In a desk type of control cabinet construction, the pedestal unit defined in claim 3 in which said upper and lower members have rim portions formed with vertically extending side walls, a slip-in type panel door removably secured in at least one of said bracket mounted open sides over said flanges and engaging portions of said upper and lower member side walls bordering said last mentioned side, said panel door being shaped to clear said flanges and mounting means attached thereto.

References Cited in the file of this patent

UNITED STATES PATENTS

| | | |
|---|---|---|
| 1,487,856 | Hauserman et al. | Mar. 25, 1924 |
| 1,490,298 | Tefft | Apr. 15, 1924 |
| 2,058,263 | Rosendale | Oct. 20, 1936 |
| 2,255,744 | Loeb et al. | Sept. 9, 1941 |
| 2,400,150 | Jones et al. | May 14, 1946 |
| 2,514,001 | Knuth | July 4, 1950 |

OTHER REFERENCES

Elgin Metalformers Corporation; copyright 1954 (4 pages); 903 No. Liberty Street, Elgin, Illinois; Bulletin 102–CA 10M–154, February 26, 1954.